US010142600B2

United States Patent
Nakagoshi

(10) Patent No.: US 10,142,600 B2
(45) Date of Patent: Nov. 27, 2018

(54) DISPLAY DEVICE

(71) Applicant: JVC KENWOOD CORPORATION, Yokohama-shi, Kanagawa (JP)

(72) Inventor: Ryosuke Nakagoshi, Yokohama (JP)

(73) Assignee: JVC KENWOOD CORPORATION, Kanagawa (JP)

( * ) Notice: Subject to any disclaimer, the term of this patent is extended or adjusted under 35 U.S.C. 154(b) by 0 days.

(21) Appl. No.: 15/700,020

(22) Filed: Sep. 8, 2017

(65) Prior Publication Data
US 2017/0374329 A1 Dec. 28, 2017

Related U.S. Application Data

(63) Continuation of application No. PCT/JP2016/000077, filed on Jan. 8, 2016.

(30) Foreign Application Priority Data

Mar. 10, 2015 (JP) ................................ 2015-047097
Dec. 2, 2015 (JP) ................................ 2015-235423

(51) Int. Cl.
*G03B 21/10* (2006.01)
*G03B 21/604* (2014.01)
(Continued)

(52) U.S. Cl.
CPC ......... *H04N 9/3105* (2013.01); *G02B 27/141* (2013.01); *G02F 1/133536* (2013.01); *H04N 9/3155* (2013.01)

(58) Field of Classification Search
CPC ........ G03B 21/10; G03B 21/14; G03B 21/56; G03B 21/604; H04N 9/3102;
(Continued)

(56) References Cited

U.S. PATENT DOCUMENTS

2009/0109351 A1* 4/2009 Shiomi ................. G02F 1/1347
 348/790
2009/0147186 A1* 6/2009 Nakai ................. G02F 1/13471
 349/74

FOREIGN PATENT DOCUMENTS

JP 2007-310045 A 11/2007
JP 2009-081645 A 4/2009
(Continued)

OTHER PUBLICATIONS

International Search Report and Written Opinion for PCT/JP2016/000077, dated Mar. 22, 2016, in 11 pages (includes English language translation of the International Search Report (PCT/ISA/210)).

*Primary Examiner* — Ryan Howard
(74) *Attorney, Agent, or Firm* — Procopio, Cory, Hargreaves & Savitch LLP

(57) ABSTRACT

A display device includes: a projection unit that emits light depending on a first picture signal, the first picture signal including three primary color signals; a display unit that includes a screen, a transmissive liquid crystal panel, and a polarizing plate, the transmissive liquid crystal panel changing a polarizing direction of each of three primary color lights from the projection unit, depending on a second picture signal including three primary color signals; and a display control unit that generates the first picture signal and the second picture signal from an input picture signal including three primary color signals, and that outputs a picture signal for controlling the projection unit based on the first picture signal and controlling the transmissive liquid crystal panel based on the second picture signal.

5 Claims, 13 Drawing Sheets

(51) Int. Cl.
 *H04N 9/31* (2006.01)
 *G02B 27/14* (2006.01)
 *G02F 1/1335* (2006.01)

(58) Field of Classification Search
 CPC .. H04N 9/3105; H04N 9/3111; H04N 9/3114;
 H04N 9/3126
 USPC ........................................ 359/453, 460, 456
 See application file for complete search history.

(56) References Cited

FOREIGN PATENT DOCUMENTS

| | | | |
|---|---|---|---|
| JP | 2009081645 A | * | 4/2009 |
| JP | 2011-076107 A | | 4/2011 |
| WO | 2007108183 A1 | | 9/2007 |

* cited by examiner

| SCHEME OF LIQUID CRYSTAL | TN | VA | IPS |
|---|---|---|---|
| SCREEN DISPLAY AT VOLTAGE-OFF | WHITE | BLACK | BLACK |
| SCREEN DISPLAY AT MAXIMUM VOLTAGE | BLACK | WHITE | WHITE |
| CONTRAST | 2 | 1 | 3 |
| VIEWING ANGLE | 3 | 2 | 1 |

Fig. 11

| | POLARIZING DIRECTION OF EMISSION LIGHT OF PROJECTION UNIT | TYPE OF RETARDATION PLATE | REFERENCE (DIRECTION OF TRANSMISSION AXIS OF EMISSION-SIDE POLARIZING PLATE) |
|---|---|---|---|
| CONFIGURATION EXAMPLE 1 | ↕ | 1/2 λ | ↕ |
| CONFIGURATION EXAMPLE 2 | ↔ | RETARDATION PLATE IS UNNECESSARY | ↕ |
| CONFIGURATION EXAMPLE 3 | ↕ | RETARDATION PLATE IS UNNECESSARY | ↔ |
| CONFIGURATION EXAMPLE 4 | ↔ | 1/2 λ | ↔ |

Fig. 12

| | POLARIZING DIRECTION OF EMISSION LIGHT OF PROJECTION UNIT | TYPE OF RETARDATION PLATE | REFERENCE (DIRECTION OF TRANSMISSION AXIS OF EMISSION-SIDE POLARIZING PLATE) |
|---|---|---|---|
| CONFIGURATION EXAMPLE 5 | ↻ | 1/4 λ | ↕ |
| CONFIGURATION EXAMPLE 6 | ↺ | | ↔ |

Fig. 13

| | POLARIZING DIRECTION OF EMISSION LIGHT OF PROJECTION UNIT | DIRECTION OF TRANSMISSION AXIS OF INCIDENCE-SIDE POLARIZING PLATE | REFERENCE (DIRECTION OF TRANSMISSION AXIS OF EMISSION-SIDE POLARIZING PLATE) |
|---|---|---|---|
| CONFIGURATION EXAMPLE 7 | UNPOLARIZED | ↔ | ↕ |
| CONFIGURATION EXAMPLE 8 | UNPOLARIZED | ↕ | ↔ |

Fig. 14

DISPLAY DEVICE

CROSS REFERENCE TO RELATED APPLICATIONS

The present application claims priority based on Japanese Patent Application No. 2015-047097 filed on Mar. 10, 2015 and Japanese Patent Application No. 2015-235423 filed on Dec. 2, 2015, and incorporates all the disclosures herein.

BACKGROUND

The present invention relates to a display device.

In recent years, there has been demanded a display device that displays a high dynamic range (HDR) picture. Dynamic range is defined as the brightness ratio between the brightest spot and the darkest spot. Regarding such a display device, for example, Japanese Unexamined Patent Application Publication No. 2007-310045 discloses a picture display device that displays a high contrast picture.

The picture display device described in Japanese Unexamined Patent Application Publication No. 2007-310045 provides a high contrast display, using an RGB projection display device that outputs light based on three primary color signals, and a Y projection display device that modulates the light from the RGB projection display device based on a luminance signal.

SUMMARY

As described above, in the technology described in Japanese Unexamined Patent Application Publication No. 2007-310045, the Y projection display device modulates the luminance of the light including RGB components. Therefore, in the RGB projection display device, the dynamic range decreases, due to the influence of light that has leaked from an R modulation element, a G modulation element, or a B modulation element. To facilitate understanding of this phenomenon, a case of displaying only the R color will be described as an example. For example, in the case of displaying only the R color, leaked light from the G modulation element and leaked light from the B modulation element enter the Y projection display device, in addition to the R light from the R modulation element. As a result, the dynamic range becomes narrow.

A display device according to an embodiment includes: a projection unit configured to emit light modulated depending on a first picture signal, the first picture signal including three primary color signals; a display unit configured to include a first screen, a transmissive liquid crystal panel, and a polarizing plate, the transmissive liquid crystal panel modulating incident light depending on a second picture signal, and then emitting the light, the second picture signal including three primary color signals, the polarizing plate emitting light that is included in the incident light and that has a predetermined polarizing direction; and a display control unit configured to generate the first picture signal for driving the projection unit and the second picture signal for driving the transmissive liquid crystal panel, from an input picture signal, and generate a synchronization signal for synchronizing the first picture signal and the second picture signal, the input picture signal including three primary color signals, in which the display unit is configured such that the first screen, the transmissive liquid crystal panel, and the polarizing plate are arrayed in this order with respect to an advancing direction of the light that is emitted from the projection unit.

BRIEF DESCRIPTION OF THE DRAWINGS

FIG. 11 is a table summarizing features of liquid crystal panels with a TN scheme, a VA scheme, and an IPS scheme;

FIG. 12 is a table summarizing configuration examples in the case where the display device is configured by a projection unit that emits linearly polarized light;

FIG. 13 is a table summarizing configuration examples in the case where the display device is configured by a projection unit that emits circularly polarized light; and FIG. 14 is a table summarizing configuration examples in the case where the display device is configured by a projection unit that emits unpolarized light.

DETAILED DESCRIPTION

Embodiment 1

Hereinafter, an embodiment of the present invention will be described with reference to the drawings.

Figure 1:
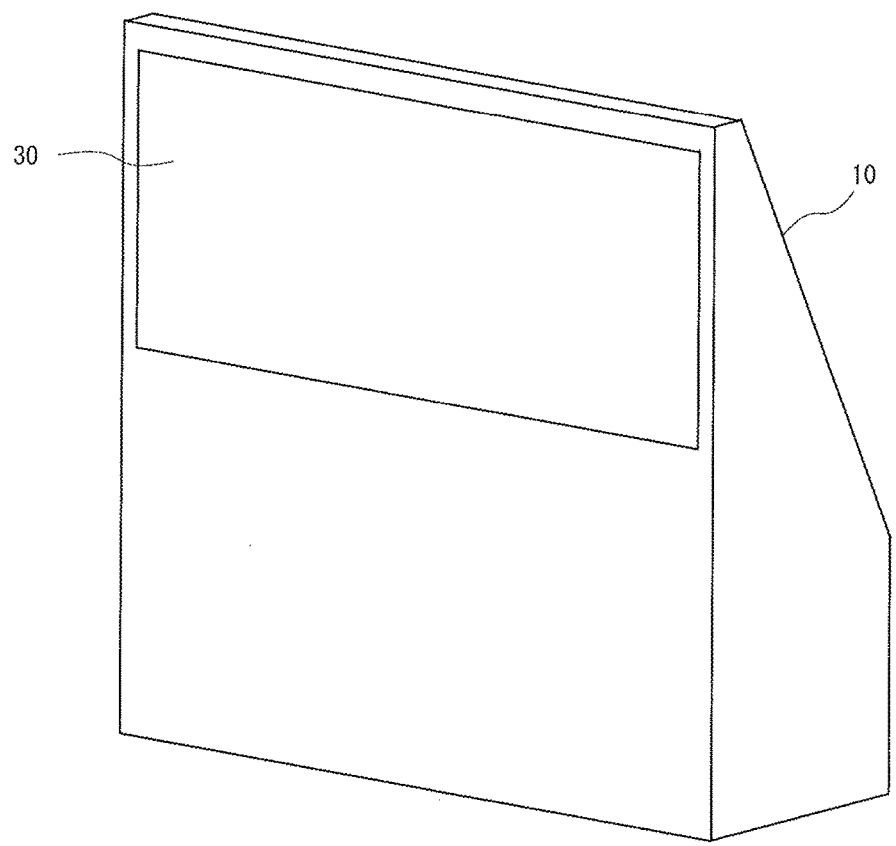
FIG. 1 is a perspective view showing the external appearance of a display device according to Embodiment 1.
Figure 2:
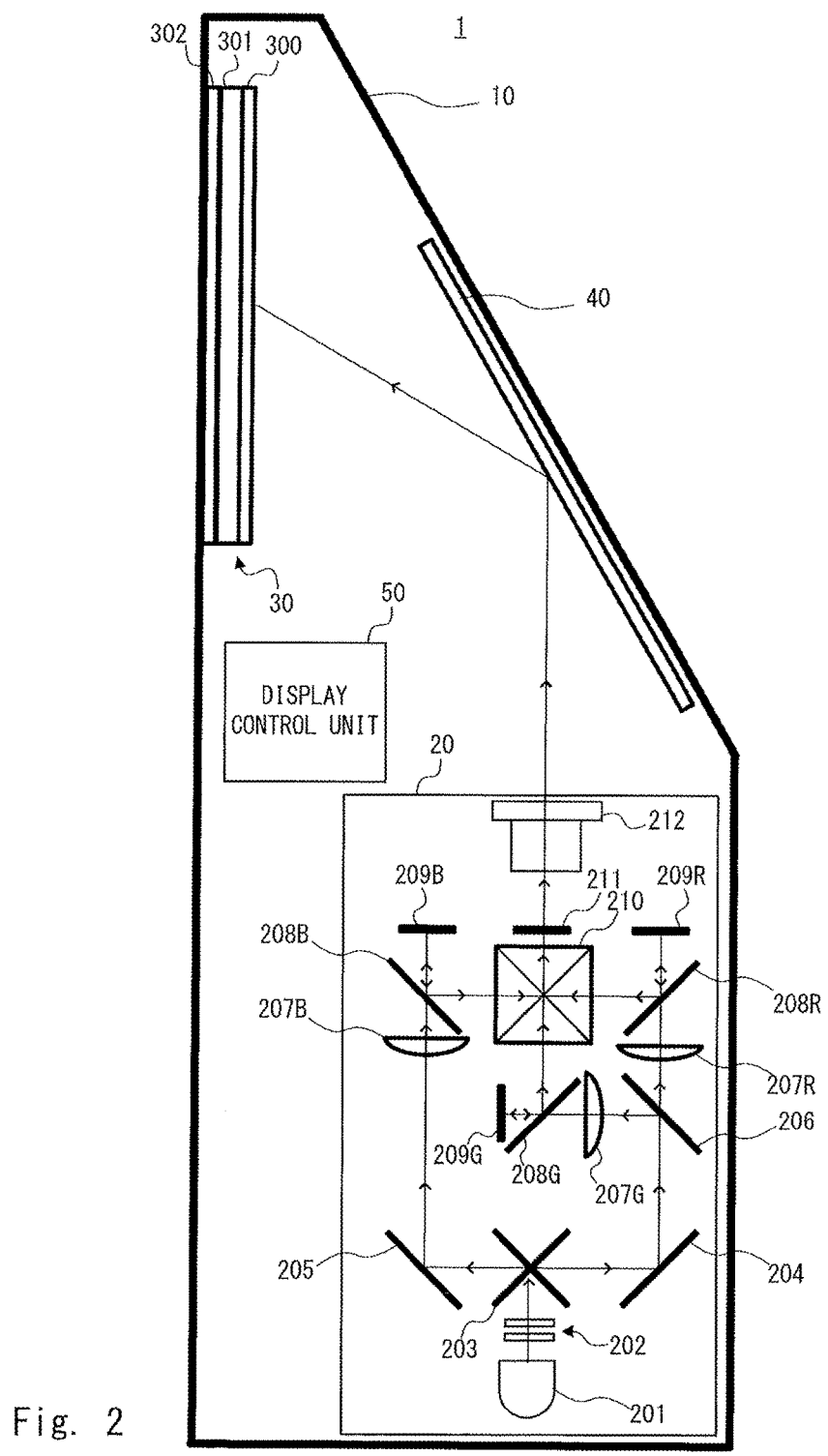
FIG. 2 is a configuration diagram showing an example of the internal configuration of the display device according to Embodiment 1.

FIG. 1 is a perspective view showing the external appearance of a display device 1. The display device 1 is a rear-projection type projector (rear projector), and a display unit 30 is provided on a front surface of a housing 10. More specifically, the display device 1 is a rear projector configured using an LCOS (Liquid Crystal on Silicon) that is a reflective liquid crystal display element. FIG. 2 is a configuration diagram showing an example of the internal configuration in the housing 10 of the display device 1.

As shown in FIG. 2, the display device 1 includes a projection unit 20, a display unit 30, a mirror 40, and a display control unit 50. The mirror 40 reflects the light emitted from the projection unit 20, in the direction of the display unit 30.

The projection unit 20 generates projection light based on a picture signal, for projecting a picture on the display unit 30. More specifically, the projection unit 20 emits linearly polarized light depending on a later-described first picture signal including three primary color signals. In the following, the configuration of the projection unit 20 will be described.

The projection unit 20 includes a light source 201. The light source 201 is a lamp, for example. The light radiated from the light source 201 enters a dichroic mirror 203, through an integrator 202 that emits the light radiated from the light source 201 while rendering uniform the illuminance distribution on a plane perpendicular to the optical axis. The dichroic mirror 203 splits the entering light into R light as a red-color band component, G light as a green-color band component, and B light as a blue-color band component. The R light and G light after the splitting by the dichroic mirror 203 enter a mirror 204. The B light after the splitting by the dichroic mirror 203 enters a mirror 205.

The R light and G light after the splitting by the dichroic mirror 203 are reflected by the mirror 204, and enter a dichroic mirror 206. The dichroic mirror 206 splits the entering R light and G light. The R light after the splitting by the dichroic mirror 206 enters, through an R field lens 207R, an R polarization control element 208R that is inclined at 45°.

The R polarization control element 208R, which is, for example, a wire-grid type polarization beam splitter, transmits P-polarized light and reflects S-polarized light. The P-polarized R light transmitted by the R polarization control element 208R enters an R display element 209R. The R display element 209R, which is configured by an LCOS, modulates the R light based on a picture signal that is output from the display control unit 50 described later. The R light after entering the R display element 209R is reflected by the R display element 209R, and returns to the R polarization control element 208R. At this time, the component modulated to the S-polarized light by the R display element 209R is reflected by the R polarization control element 208R, in the direction of a dichroic prism 210. The R light reflected in the direction of the dichroic prism 210 enters a first surface of the dichroic prism 210. On the other hand, the component not modulated by the R display element 209R is transmitted by the R polarization control element 208R, and returns in the direction of the R field lens 207R.

The G light after the splitting by the dichroic mirror 206 enters, through a G field lens 207G, a G polarization control element 208G that is inclined at 45°. The G polarization control element 208G, which is, for example, a wire-grid type polarization beam splitter, transmits P-polarized light and reflects S-polarized light. The P-polarized G light transmitted by the G polarization control element 208G enters a G display element 209G. The G display element 209G, which is configured by an LCOS, modulates the G light based on a picture signal that is output from the display control unit 50. The G light after entering the G display element 209G is reflected by the G display element 209G, and returns to the G polarization control element 208G. At this time, the component modulated to the S-polarized light by the G display element 209G is reflected by the G polarization control element 208G, in the direction of a dichroic prism 210. The G light reflected in the direction of the dichroic prism 210 enters a second surface of the dichroic prism 210. On the other hand, the component not modulated by the G display element 209G is transmitted by the G polarization control element 208G, and returns in the direction of the G field lens 207G.

The B light after the splitting by the dichroic mirror 203 is reflected by the mirror 205, and enters, through a B field lens 207B, a B polarization control element 208B that is inclined at 45°. The B polarization control element 208B, which is, for example, a wire-grid type polarization beam splitter, transmits P-polarized light and reflects S-polarized light. The P-polarized B light transmitted by the B polarization control element 208B enters a B display element 209B. The B display element 209B, which is configured by an LCOS, modulates the B light based on a picture signal that is output from the display control unit 50. The B light after entering the B display element 209B is reflected by the B display element 209B, and returns to the B polarization control element 208B. At this time, the component modulated to the S-polarized light by the B display element 209B is reflected by the B polarization control element 208B, in the direction of the dichroic prism 210. The B light reflected in the direction of the dichroic prism 210 enters a third surface of the dichroic prism 210. On the other hand, the component not modulated by the B display element 209B is transmitted by the B polarization control element 208B, and returns in the direction of the B field lens 207B. In the following description, the R display element 209R, the G display element 209G, and the B display element 209B are collectively referred to as the display element 209, in some cases.

The dichroic prism 210 emits the S-polarized component of each of the R light, G light, and B light emitted from the three directions, toward a projection lens 212. Accordingly, linearly polarized light is emitted to the projection lens 212. The light emitted from the dichroic prism 210 enters the projection lens 212 through a retardation plate 211. The retardation plate 211 sets the polarizing direction of the emission light from the projection unit 20, to a polarizing direction required for the incident light of the display unit 30. For example, the polarizing direction required for the incident light of the display unit 30 is a direction resulting from rotating by 90° a polarizing direction in which the light is transmitted by a later-described polarizing plate 302 of the display unit 30. The projection lens 212 projects the entering light to the display unit 30 through the mirror 40, and forms an image. Thus, the light emitted from the projection unit 20 is linearly polarized light. As described above, in the embodiment, the linearly polarized light emitted from the projection unit 20 enters a screen 300 through the retardation plate 211. However, in the case where the polarizing direction of the emission light from the projection unit 20 has already been set to the polarizing direction required for the incident light of the display unit 30 without using the retardation plate 211, the retardation plate 211 does not need to be provided. For example, the retardation plate 211 may be excluded, and the polarizing direction of the emission light from the projection unit 20 may be set to the polarizing direction required for the incident light of the display unit 30, by arbitrarily adjusting the polarizing direction while rotating the projection unit 20 around an axis in the advancing direction of the light that is emitted from the projection unit 20.

Next, the display unit 30 will be described. As shown in FIG. 2, the display unit 30 includes a transmissive liquid crystal panel 301 having a previously determined resolution, the polarizing plate 302 having a size corresponding to the size of a display surface of the transmissive liquid crystal panel 301, and the screen 300 having a size corresponding to the size of the transmissive liquid crystal panel 301.

In the display unit 30, the screen 300, the transmissive liquid crystal panel 301 and the polarizing plate 302 are integrally disposed so as to be arrayed in the order of the screen 300, the transmissive liquid crystal panel 301 and the polarizing plate 302 with respect to the advancing direction of the light that is emitted from the projection unit 20.

The screen 300 is a screen that has a characteristic for maintaining the polarization of the entering light. As the screen that has a characteristic for maintaining the polarization, for example, Blue Ocean Screen manufactured by Nitto Jushi Kogyo Co., Ltd. can be used. Here, as shown in FIG. 2, in the transmissive liquid crystal panel 301, it is not always necessary to provide a polarizing plate on the incident side for the light from the projection unit 20. This is because the light emitted from the projection unit 20 is linearly polarized light as described above and therefore it is not necessary to arrange polarization planes on a single plane at a stage before the light enters the transmissive liquid crystal panel 301.

The transmissive liquid crystal panel 301 includes a liquid crystal layer and a glass substrate, which are not illustrated, and modulates each of the three primary color lights from the projection unit 20 and changes the polarizing direction, depending on a later-described second picture signal including three primary color signals. The light having passed through the transmissive liquid crystal panel 301 enters the polarizing plate 302. The polarizing plate 302 transmits light polarized in a predetermined direction. By such a configuration, the display unit 30 performs a display, by controlling, for each pixel, the respective transmission amounts of the R light, G light, and B light emitted from the projection unit 20, based on the second picture signal. Here, the resolution of the display unit 30 corresponds to the resolution of the projection unit 20, and the pixels of the projection unit 20 correspond to the pixels of the transmissive liquid crystal panel 301, on a one-to-one basis. Accordingly, each of the R light modulated by the R display element 209R, the G light modulated by the G display element 209G, and the B light modulated by the B display element 209B, corresponding to one pixel of the projection unit 20, is modulated in the display unit 30, in accordance with the second picture signal. It is necessary to perform the alignment between the dot of the light to be projected by the projection unit 20 and the pixel of the transmissive liquid crystal panel 301 such that the two correspond to each other. Here, if the projection light from the projection unit 20 exactly focuses on the transmissive liquid crystal panel 301, there is a concern that a moire pattern appears due to the dot of the projection light from the projection unit 20 and the pixel structure of the transmissive liquid crystal panel 301. However, in the present embodiment, the projection light from the projection unit 20 that enters the transmissive liquid crystal panel 301 is diffused by the screen 300, immediately before the incidence. Therefore, the projection light does not directly focus on the transmissive liquid crystal panel 301, and thereby, the appearance of the moire pattern can be reduced.

Figure 3A:
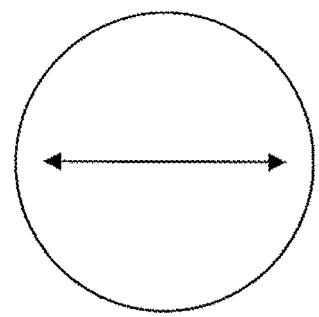
FIG. 3A is a diagram schematically showing a polarization state in the display device according to Embodiment 1, and shows the polarization state of light that enters a retardation plate.
Figure 3B:
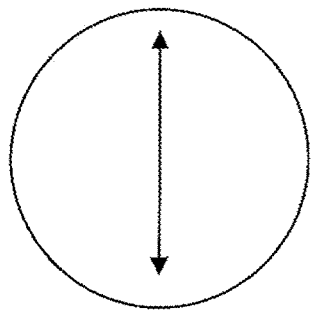
FIG. 3B is a diagram schematically showing a polarization state in the display device according to Embodiment 1, and shows the polarization state of light that is emitted from the retardation plate.
Figure 3C:
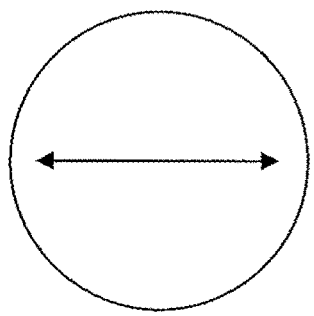
FIG. 3C is a diagram schematically showing a polarization state in the display device according to Embodiment 1, and shows the polarization state of light that is emitted from a display unit.
Figure 4A:
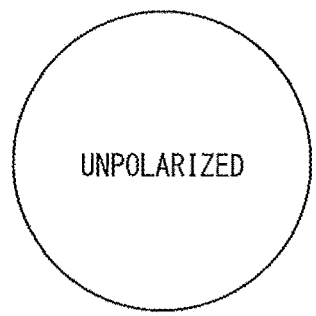
FIG. 4A is a diagram schematically showing a polarization state in the configuration of a comparative example, and shows the polarization state of light that enters a retardation plate.
Figure 4B:
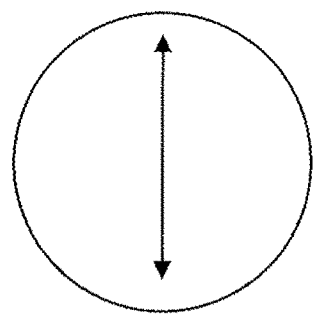
FIG. 4B is a diagram schematically showing a polarization state in the configuration of the comparative example, and shows the polarization state of light that is emitted from the retardation plate.
Figure 4C:
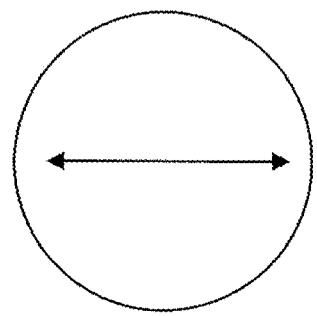
FIG. 4C is a diagram schematically showing a polarization state in the configuration of the comparative example, and shows the polarization state of light that is emitted from a display unit.

Here, polarization states in the display device 1 will be described. FIG. 3A to FIG. 3C are diagrams schematically showing polarization states in the display device 1. FIG. 4A to FIG. 4C are diagrams schematically showing polarization states in the configuration of a comparative example. Here, suppose that the comparative example has a configuration in which the configuration of the projection unit 20 is replaced with a DLP (Digital Light Processing). That is, in the configuration according to the comparative example, the configuration of the former stage of the retardation plate 211 in the projection unit 20 is implemented by the DLP. FIG. 3A and FIG. 4A show polarization states of lights that enter the retardation plate 211, FIG. 3B and FIG. 4B show polarization states of lights that are emitted from the retardation plate 211, and FIG. 3C and FIG. 4C show polarization states of lights that are emitted from the display unit 30. Here, more specifically, FIG. 4B shows a polarization state after the light emitted from the retardation plate 211 is transmitted by an added polarizing plate.

As described above, in the embodiment, the light that enters the retardation plate 211 is linearly polarized light (see FIG. 3A). In the embodiment, the polarizing direction is adjusted by the retardation plate 211 (see FIG. 3B). On the other hand, in the case of the configuration according to the comparative example, the light that enters the retardation plate 211 is in an unpolarized state (see FIG. 4A). Therefore, in the case of the configuration according to the comparative example, it is necessary to provide a polarizing plate at the former stage of the transmissive liquid crystal panel 301. By providing the polarizing plate at the former stage of the transmissive liquid crystal panel 301 in this way, a polarization required for the incident light of the transmissive liquid crystal panel 301 is achieved (see FIG. 4B). However, in the case of providing the polarizing plate at the former stage of the transmissive liquid crystal panel 301 in this way, light quantity is lost by the polarizing plate. Further, costs rise in connection with provision of a polarizing plate corresponding to the size of the transmissive liquid crystal panel 301. Here, the polarization state of the light emitted from the display unit 30 is linearly polarized light in the polarizing direction of the light that is transmitted by the polarizing plate 302. In the configuration shown in the comparative example, the retardation plate 211 may be excluded.

Figure 5:
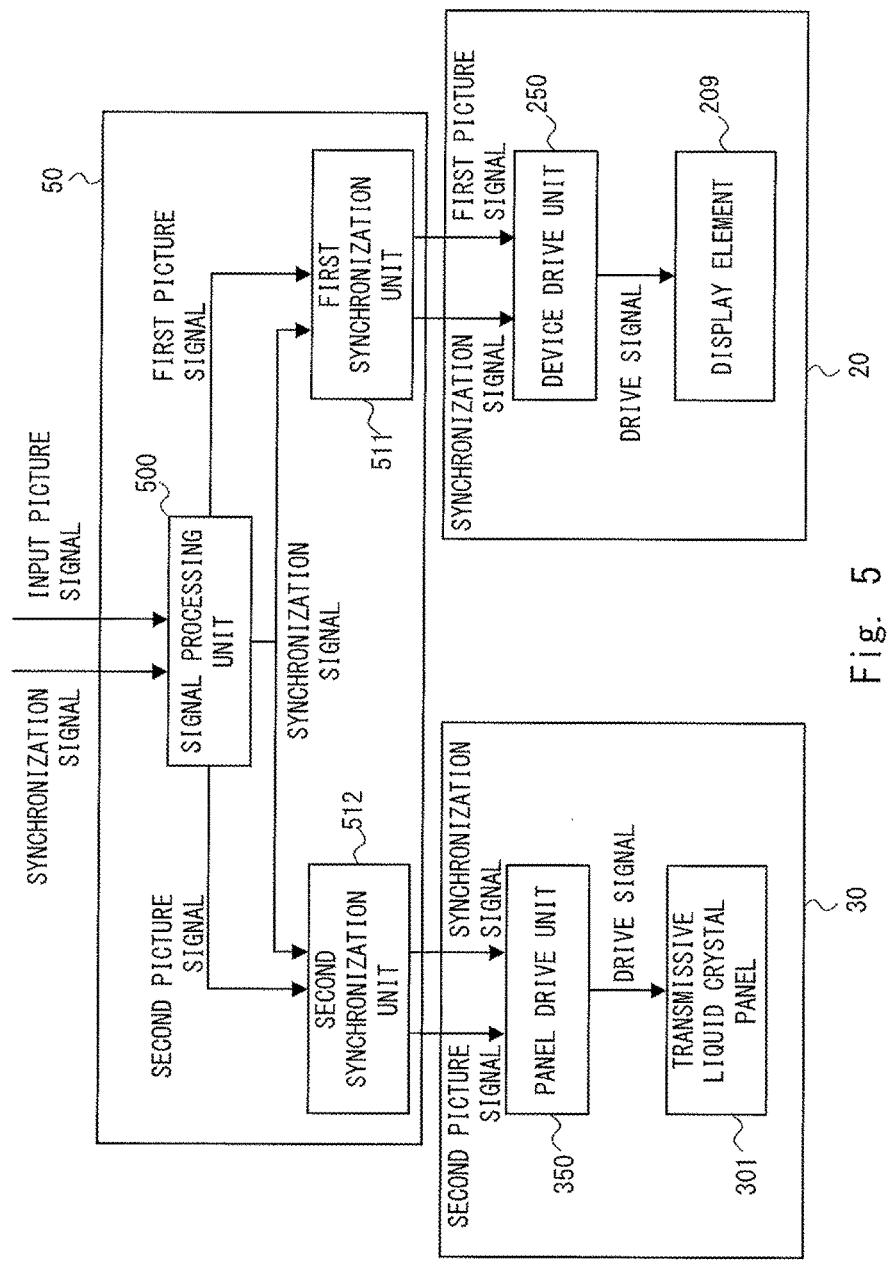
FIG. 5 is a block diagram showing the configuration of the display device according to Embodiment 1.

FIG. 5 is a block diagram showing the configuration of the display device 1. As shown in FIG. 5, the display control unit 50 includes a signal processing unit 500, a first synchronization unit 511, and a second synchronization unit 512. Each constituent of the display control unit 50 may be implemented by software with a program, or may be implemented by any combination of hardware, firmware, and software, or the like. In the case of implementation by a program, an unillustrated CPU (Central Processing Unit) of the display control unit 50 executes the program stored in, for example, an unillustrated memory of the display control unit 50.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

To the signal processing unit 500, an input picture signal and a synchronization signal are input. The input picture signal to be input to the signal processing unit 500, for example, may be a signal transferred from another device to the display device 1, or may be a signal stored in an unillustrated storage device of the display device 1. As the synchronization signal, for example, a synchronization signal generated by an unillustrated synchronization signal generation circuit is input to the signal processing unit 500.

The input picture signal is a picture signal including three primary color signals for RGB. The input picture signal, for example, is a picture signal having a higher bit level than an 8-bit picture signal, which is typical for picture signals. That is, for example, the input picture signal is configured by a 16-bit input picture signal for the R color, a 16-bit input picture signal for the G color, and a 16-bit input picture signal for the B color. The input picture signal is a picture signal in which a gamma correction to a predetermined gamma value has been performed. By way of example, the gamma value of the gamma characteristic of the input picture signal is 2.2.

From the input picture signal, the signal processing unit 500 generates a first picture signal for performing the display control of the projection unit 20, and a second picture signal for performing the display control of the display unit 30. That is, the signal processing unit 500 generates the first picture signal and the second picture signal from the input picture signal, controls the projection unit 20 based on the first picture signal, and controls the transmissive liquid crystal panel 301 based on the second picture signal. The generation of the first picture signal and the second picture signal by the signal processing unit 500 will be described later. The signal processing unit 500 performs processing, in synchronization with the input synchronization signal.

The signal processing unit 500 outputs the generated first picture signal to the first synchronization unit 511. Further, the signal processing unit 500 outputs the generated second picture signal to the second synchronization unit 512. In addition, the synchronization signal is output to the first synchronization unit 511 and the second synchronization unit 512.

The first picture signal is supplied to a device drive unit 250 of the projection unit 20, through the first synchronization unit 511. The second picture signal is supplied to a panel drive unit 350 of the display unit 30, through the second synchronization unit 512.

In the projection unit 20 and the transmissive liquid crystal panel 301, various signal processes (drive and the like) are performed after the input of the picture signal and before the image output. Therefore, it takes a certain amount of time before the image output. Here, the time required for the image output in the projection unit 20 and the time required for the image output in the transmissive liquid crystal panel 301 are different. Therefore, it is necessary to perform synchronization for matching the image output timings of the two. Accordingly, the first synchronization unit 511 and the second synchronization unit 512 perform delay processes of adding optimal delays to the first picture signal and the second picture signal, respectively. It may be the case that the delay process is performed in one of the first synchronization unit 511 and the second synchronization unit 512. The first synchronization unit 511 and the second synchronization unit 512 perform the delay processes based on the synchronization signal. Then, the first synchronization unit 511 outputs the first picture signal to the device drive unit 250 of the projection unit 20. The second synchronization unit 512 outputs the second picture signal to the panel drive unit 350 of the display unit 30.

The device drive unit 250 generates a drive signal for driving the display element 209, in accordance with the first picture signal, and drives the display element 209 through the drive signal. The panel drive unit 350 generates a drive signal for driving the transmissive liquid crystal panel 301, in accordance with the second picture signal, and drives the transmissive liquid crystal panel 301 through the drive signal.

Figure 6:
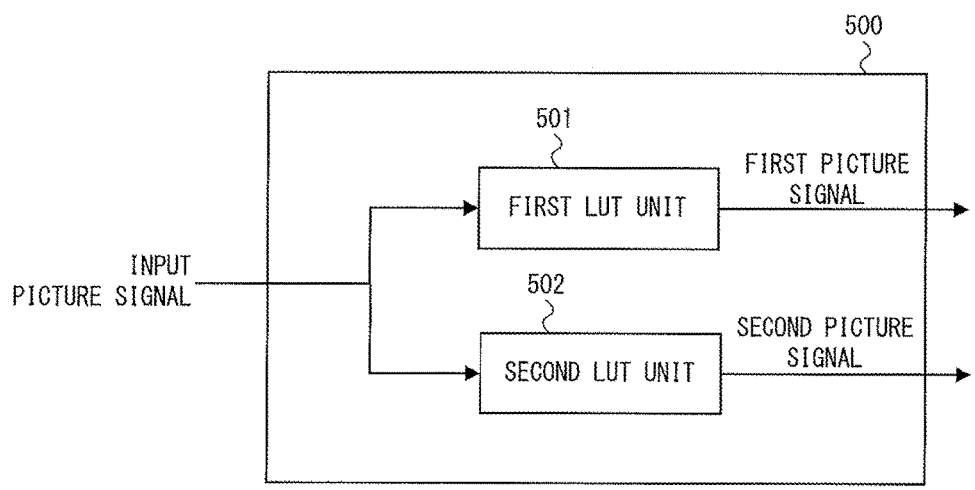
FIG. 6 is a block diagram showing the configuration of a signal processing unit according to Embodiment 1.

FIG. 6 is a block diagram showing the configuration of the signal processing unit 500. As shown in FIG. 6, the signal processing unit 500 includes a first LUT (Lookup table) unit 501, and a second LUT unit 502. The first LUT unit 501 and the second LUT unit 502 are implemented, for example, by a storage device such as an unillustrated memory of the display control unit 50.

The first LUT unit 501 is a lookup table for adjusting the projection unit 20 to a first output characteristic. The second LUT unit 502 is a lookup table for adjusting the transmissive liquid crystal panel 301 to a second output characteristic. The sum of the gamma value of the first output characteristic and the gamma value of the second output characteristic is equal to the gamma value of the input picture signal. Here, the description will be provided assuming that the gamma value of the input picture signal is 2.2. In this case, the input picture signal is properly displayed when the gamma value of the output characteristic is 2.2. Accordingly, it is necessary to realize a display device in which the gamma value of the output characteristic is 2.2 as the whole of the output by the projection unit 20 and the output by the display unit 30. Hence, for example, the first LUT unit 501 is configured as a table in which the output characteristic of the projection unit 20 has been adjusted such that the gamma is 1.1. Further, the second LUT unit 502 is configured as a table in which the output characteristic of the display unit 30 has been adjusted such that the gamma is 1.1. Such a table can be created, for example, by actually performing the output in the projection unit 20 or the display unit 30 and measuring the illuminance at that time with an illuminance meter. As a result, the display device 1 can have an output characteristic with a gamma value of 2.2 (=1.1+1.1).

The signal processing unit 500 gives the input picture signal as the inputs of the first LUT unit 501 and the second LUT unit 502. Then, the signal processing unit 500 adopts the output of the first LUT unit 501 with respect to the input picture signal, as the first picture signal, and adopts the output of the second LUT unit 502 with respect to the input picture signal, as the second picture signal. At this time, the first picture signal and the second picture signal are generated for each of the RGB signals of the input picture signal. That is, the first picture signal for R and the second picture signal for R are generated from the input picture signal for R. The first picture signal for G and the second picture signal for G are generated from the input picture signal for G. The first picture signal for B and the second picture signal for B are generated from the input picture signal for B. Here, in the generation of the first picture signal and the second picture signal, as described above, each of RGB only has to be independently processed by the LUTs, and arbitrary bit numbers can be adopted as the bit numbers of the first picture signal and the second picture signal. For example, in the case where the input picture signal has 16 bits, the first picture signal and the second picture signal may be 16-bit picture signals. Alternatively, a signal of the upper 8 bits on the MSB (most significant bit) side may be supplied as the first picture signal, and a signal of the lower 8 bits on the LSB (least significant bit) side may be supplied as the second picture signal.

Here, the gamma value that is realized by the LUTs will be further described. In the embodiment, as described above, the gamma characteristic of the input picture signal is divided into two, and therefore, the first output characteristic and the second output characteristic are close to a linear characteristic. Therefore, the reproducibility of the dark-part gradation is enhanced. For example, in the case where the gamma value of the gamma characteristic of the input picture signal is specified as 2.2, the first output characteristic and the second output characteristic are 1.1 in the simple division described above. In the case where the gamma value is 2.2, a value of 1 in the 8-bit input corresponds to a brightness of about 0.000005 with respect to white (a value of 255 in the 8-bit input). Therefore, unless the contrast on the display surface can be displayed at 2000000:1, it is not possible to reproduce a brightness that is indicated by a value of 1 (8 bits) in a theoretical gamma curve. On the other hand, in the case where the gamma value is 1.1, a value of 1 in the 8-bit input corresponds to a brightness of about 0.0023 with respect to white (a value of 255 in the 8-bit input), and it is only necessary that the contrast on the display surface can be displayed at 440:1. Therefore, it is possible to reduce the contrast performance that is required in the transmissive liquid crystal panel 301. That is, it is possible to achieve an ideal gamma characteristic by a combination of a relatively easily obtainable transmissive liquid crystal panel 301 and the projection unit 20.

Further, when the first picture signal and the second picture signal are generated from the input picture signal, the gamma adjustment is easily achieved because of the independence of RGB as described above. For example, in the case where the luminance is modulated as described in Japanese Unexamined Patent Application Publication No. 2007-310045, the Y (luminance) signal is generated from an input picture signal for RGB, and therefore it is not easy to maintain gradation property in an RGB-mixed color. This is because one dimension is added for the generation of the Y signal and the three dimensions of RGB need to be converted into the four dimensions of RGBY. On the other hand, in the embodiment, the RGB signals of the input picture signal are divided into the RGB signals of the first picture signal and the RGB signals of the second picture signal. Therefore, each color is processed independently, and the gradation property is easily maintained. Further, because of the conversion from the three dimensions of RGB to the three dimensions of RGB, the generation of the first picture signal and the second picture signal is achieved relatively easily.

Furthermore, according to the display device 1 in the embodiment, it is possible to display an input picture signal having a great gamma value of 2.2-th power or greater as the gamma characteristic. The reason is shown as follows. For example, in the case where the gamma characteristic is 2.2, the luminance (brightness) has a value specified by the 2.2-th power of the input picture signal. For example, a value of 1 in the 8-bit signal is $1/255 = 0.003921 \ldots$, and the luminance (brightness) is $(1/255)^{2.2} = 0.000005077 \ldots$. Therefore, in the case where the gamma characteristic is set to a value greater than 2.2-th power, the luminance has a value less than that in the case of 2.2-th power (namely, is darker), even when the input picture signal is the same. Therefore, in a display device in the related art, as the gamma characteristic of the input picture signal becomes greater than 2.2-th power, the display at the specified luminance becomes more difficult. On the other hand, in the embodiment, the multiplication product of the output values of the projection unit 20 and the transmissive liquid crystal panel 301 is the final output value, and therefore, the display at the specified luminance is relatively easy. Thus, according to the display device 1, it is possible to display an input picture signal having a great gamma value of 2.2-th power or greater as the gamma characteristic. Since the dark-part gradation property is kept more suitably as the gamma value of the gamma characteristic of the input picture signal becomes greater, the display device 1 according to the embodiment also contributes to reduction in the quantization error of the dark-part gradation, by processing the error in image data quantization as the image data in the floating-point format.

Figure 7A:
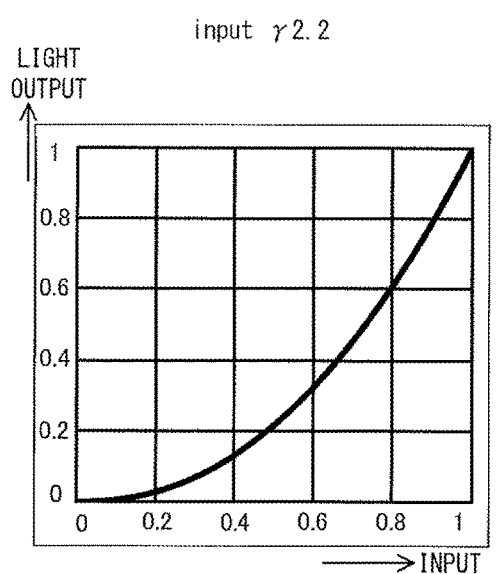
FIG. 7A is a graph showing an example of the gamma characteristic of the display device according to Embodiment 1, and shows the gamma characteristic of an input picture signal.
Figure 7B:
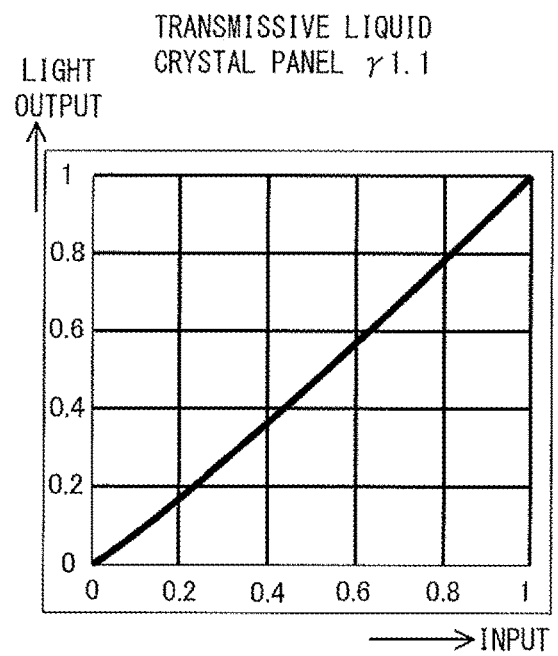
FIG. 7B is a graph showing an example of the gamma characteristic of the display device according to Embodiment 1, and shows the gamma characteristic of a transmissive liquid crystal panel.
Figure 7C:
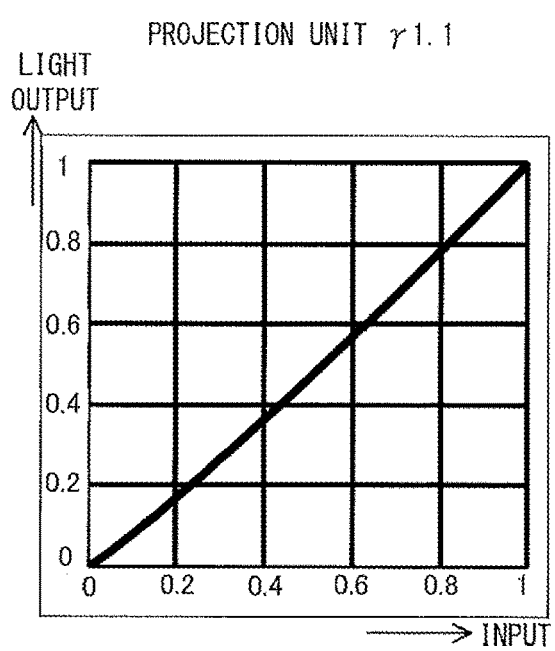
FIG. 7C is a graph showing an example of the gamma characteristic of the display device according to Embodiment 1, and shows the gamma characteristic of the projection unit.
Figure 8A:
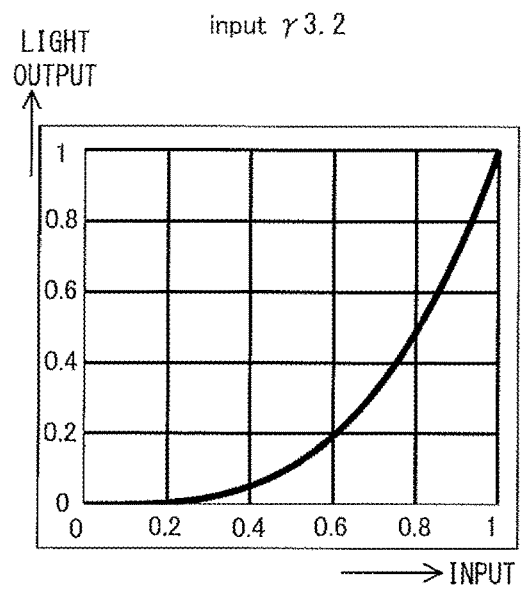
FIG. 8A is a graph showing an example of the gamma characteristic of the display device according to Embodiment 1, and shows the gamma characteristic of the input picture signal.
Figure 8B:
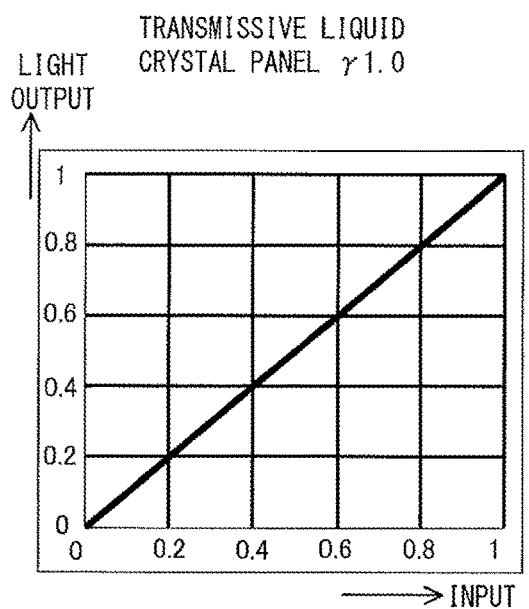
FIG. 8B is a graph showing an example of the gamma characteristic of the display device according to Embodiment 1, and shows the gamma characteristic of the transmissive liquid crystal panel.
Figure 8C:
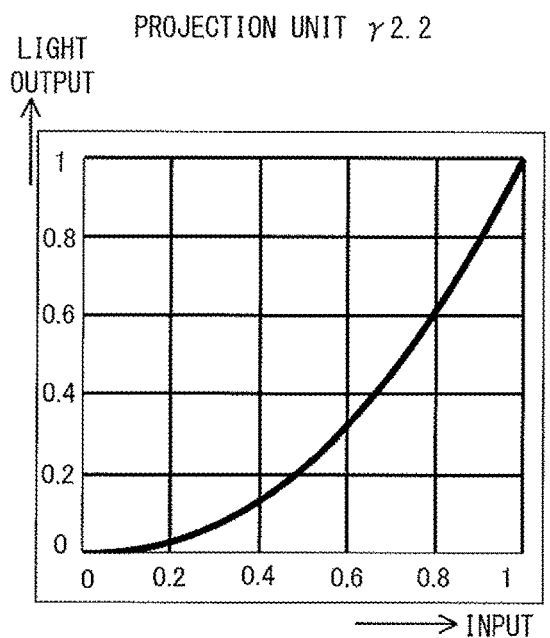
FIG. 8C is a graph showing an example of the gamma characteristic of the display device according to Embodiment 1, and shows the gamma characteristic of the projection unit.
Figure 9A:
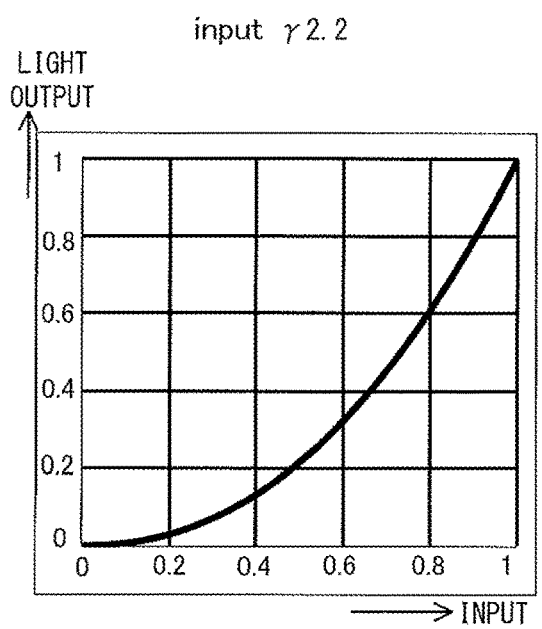
FIG. 9A is a graph showing an example of the gamma characteristic of the display device according to Embodiment 1, and shows the gamma characteristic of the input picture signal.
Figure 9B:
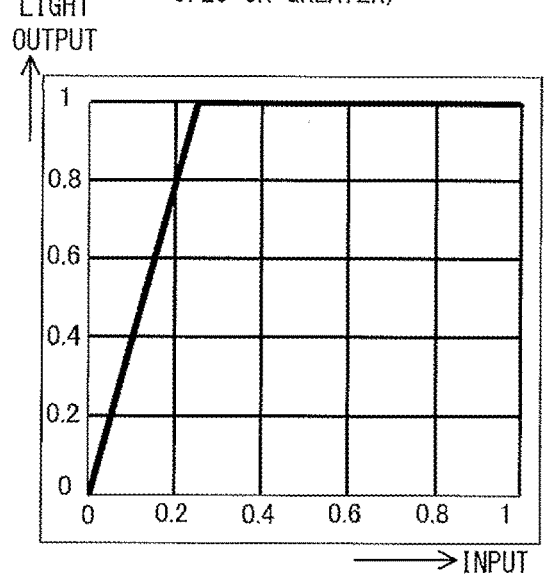
FIG. 9B is a graph showing an example of the gamma characteristic of the display device according to Embodiment 1, and shows the gamma characteristic of the transmissive liquid crystal panel.
Figure 9C:
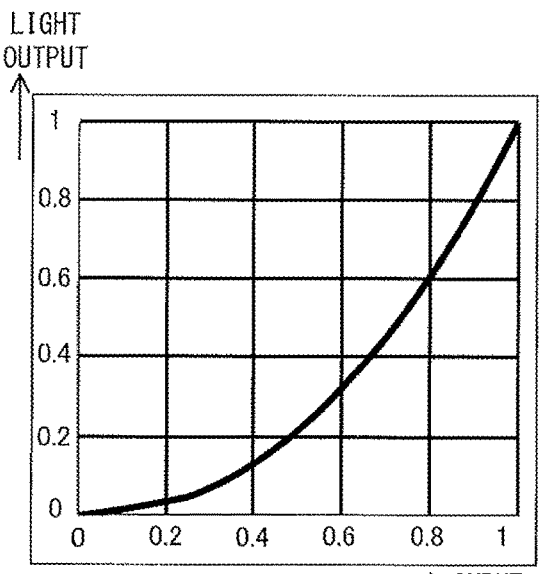
FIG. 9C is a graph showing an example of the gamma characteristic of the display device according to Embodiment 1, and shows the gamma characteristic of the projection unit.

In the above description, by way of example, the gamma value of the first output characteristic (that is, the gamma value of the output characteristic of the projection unit 20) is 1.1, and the gamma value of the second output characteristic (that is, the gamma value of the output characteristic of the display unit 30) is 1.1. However, the present embodiment is not limited to these values. That is, it is only necessary that the sum of the gamma value of the first output characteristic and the gamma value of the second output characteristic is equal to the gamma value of the input picture signal. FIG. 7A to FIG. 7C, FIG. 8A to FIG. 8C, and FIG. 9A to FIG. 9C are graphs showing examples of the relation (gamma characteristic) between the input value that is the input picture signal or the picture signal, and the light output, in the display device 1 according to the embodiment. FIG. 7A, FIG. 8A, and FIG. 9A show the gamma characteristics of the input picture signal, FIG. 7B, FIG. 8B, and FIG. 9B show the gamma characteristics of the transmissive liquid crystal panel 301, and FIG. 7C, FIG. 8C, and FIG. 9C show the gamma characteristics of the projection unit 20. In each of FIG. 7A to FIG. 7C, FIG. 8A to FIG. 8C, and FIG. 9A to FIG. 9C, the x-axis indicates the input value that is the input picture signal or the picture signal, and the y-axis indicates the light output value. That is, in FIG. 7B, FIG. 8B, and FIG. 9B, the x-axis indicates the input value that is the second picture signal to be output from the second LUT unit 502, and the y-axis indicates the light output value of the transmissive liquid crystal panel 301. In FIG. 7C, FIG. 8C, and FIG. 9C, the x-axis indicates the input value that is the first picture signal to be output from the first LUT unit 501, and the y-axis indicates the light output value of the projection unit 20.

FIG. 7A to FIG. 7C show the above-described example in which the gamma values of the first output characteristic (the output characteristic of the projection unit 20) and the second output characteristic (the output characteristic of the transmissive liquid crystal panel 301) are 1.1 in the case where the gamma value of the gamma characteristic of the input picture signal is specified as 2.2.

FIG. 8A to FIG. 8C show an example in which the gamma value of the first output characteristic (the output characteristic of the projection unit 20) is 2.2 and the gamma value of the second output characteristic (the output characteristic of the transmissive liquid crystal panel 301) is 1 in the case where the gamma value of the gamma characteristic of the input picture signal is specified as 3.2. Here, it is assumed that the projection unit 20 has a higher contrast than the transmissive liquid crystal panel 301. In this way, the gamma value of the output characteristic of one of the projection unit 20 and the transmissive liquid crystal panel 301 that has a higher contrast may be adjusted so as to be greater than the gamma value of the output characteristic of one of the projection unit 20 and the transmissive liquid crystal panel 301 that has a lower contrast. Thereby, it is possible to enhance the contrast of the whole of the display device 1.

FIG. 9A to FIG. 9C show an example in which the modulation of the transmissive liquid crystal panel 301 is performed in a predetermined limited range on the dark-part side. The example shown in FIG. 9A to FIG. 9C is an example in which the gamma value of the first output characteristic (the output characteristic of the projection unit 20) is 2.2 (here, the gamma value is 1.2 in the case where the input is 0.25 or less) and the gamma value of the second output characteristic (the output characteristic of the transmissive liquid crystal panel 301) is 1 in the case where the gamma value of the gamma characteristic of the input picture signal is specified as 2.2. In the second output characteristic, in the case where the input value is 0.25 or greater, the light output quantity is maximized in the same manner. In this way, in the case where the input value is equal to or greater than a previously determined value, the output may be fixed at the maximum in the output characteristic of the transmissive liquid crystal panel 301. Thereby, there is an advantage that it is possible to assign all gradations of the transmissive liquid crystal panel 301 in a gamma region in which the input value is 0.25 or less and to express gradations on the dark-part side as minute gradations.

The display device 1 according to the embodiment has been described above. In the display device 1, as described above, the light modulated for each of RGB by the projection unit 20 is output, and each of the RGB lights emitted from the projection unit 20 is further modulated in the transmissive liquid crystal panel 301. Thereby, it is possible to suppress the influence of leaked light, and to enhance contrast. Here, by way of example, a case of displaying only the R color will be described with a comparative example. For example, in the case of assuming a liquid crystal display in which the first modulation is performed by the control of a backlight and the like and the second modulation is performed to the light of the backlight as a comparative example, leaked lights of the G light and the B light in a device for the second modulation causes the decrease in contrast. Further, by the influence of the leaked lights of the G light and the B light, a color shifted from the original color; that is, a color shifted to a point in the white color direction in a chromaticity diagram is displayed. Further, as a comparative example, for example, in the case where the luminance is modulated by a device for the second modulation as described in Japanese Unexamined Patent Application Publication No. 2007-310045, the same problem occurs despite being improved compared to the comparative example of the above liquid crystal display. On the other hand, in the display device 1 according to the embodiment, since each of the R light, the G light, and the B light is doubly modulated, it is possible to suppress leaked light. Therefore, it is possible to suppress the contrast decrease and the color shift, and particularly, even for a chromatic color, it is possible to expand the dynamic range. That is, according to the embodiment, it is possible to provide a display device that can provide a display in a high dynamic range.

In the present embodiment, the light emitted from the projection unit 20 is diffused by the screen 300, and then enters the transmissive liquid crystal panel 301. Therefore, the projection light does not directly focus on the transmissive liquid crystal panel 301, and thereby, the appearance of the moire pattern can be reduced. Accordingly, it is not necessary to perform the position adjustment for reducing the moire pattern, and therefore, the alignment between the projection unit 20 and the transmissive liquid crystal panel 301 becomes easy.

Embodiment 2

Figure 10:
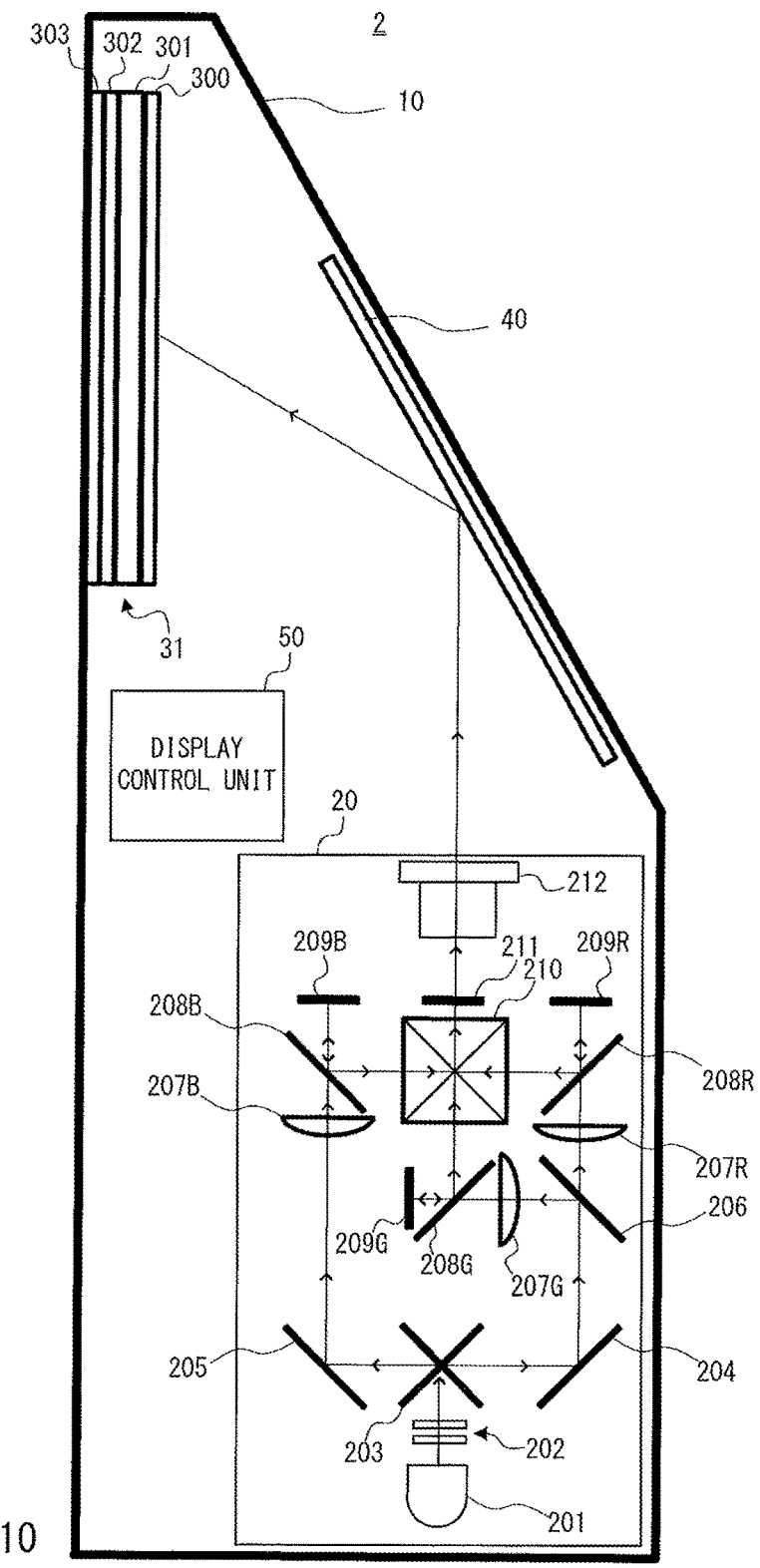
FIG. 10 is a configuration diagram showing an example of the internal configuration of a display device according to Embodiment 2.

Next, Embodiment 2 of the present invention will be described. FIG. 10 is a configuration diagram showing an example of the internal configuration of the display device 2 according to Embodiment 2. In the following description, identical reference characters are assigned to elements identical to the above-described elements, and repetitive descriptions are omitted. As shown in FIG. 10, the display device 2 is different from the display device 1 in that the display unit 30 is replaced with a display unit 31.

The display unit 31 includes the screen 300, the transmissive liquid crystal panel 301, the polarizing plate 302, and a screen 303 having a size corresponding to the size of the transmissive liquid crystal panel 301. In the display unit 31, the screen 300, the transmissive liquid crystal panel 301, the polarizing plate 302, and the screen 303 are integrally disposed so as to be arrayed in the order of the screen 300, the transmissive liquid crystal panel 301, the polarizing plate 302, and the screen 303 with respect to the advancing direction of the light that is emitted from the projection unit 20. Further, for example, since the transmissive liquid crystal panel 301 has a certain thickness, there can be a problem in that two images of an image projected on the screen 300 and an image displayed by the transmissive liquid crystal panel 301 are visually recognized with a slight mismatch due to parallax when the position of the viewing point deviates from the front face of the display unit 30. However, since the screen 303 is disposed, there is an advantage that the visual recognition of the two images with the mismatch is moderated. Here, the screen 303 may be a film that has a thickness and transparency allowing the slight image mismatch due to parallax to be blurred.

The present invention is not limited to the above embodiment, and modifications can be appropriately made without departing from the spirit. For example, in the above embodiment, the input picture signal, the first picture signal, and the second picture signal have been described as RGB signals, but may be signals indicated in another color space. For example, signals indicated by a luminance signal and two color difference signals, as exemplified by YPbPr signals may be used.

The above embodiment adopts a configuration in which the projection unit 20 emits the linearly polarized light, but the projection unit 20 may be replaced with a projection unit to emit light that is modulated depending on the above-described first picture signal and that is other than the linearly polarized light. That is, for example, there may be used a projection unit to emit circularly polarized light that is modulated depending on the above-described first picture signal, or a projection unit to emit unpolarized light that is modulated depending on the above-described first picture signal. As the drive scheme for the transmissive liquid crystal panel 301, an arbitrary scheme can be adopted. For example, the transmissive liquid crystal panel 301 may be a liquid crystal panel with a TN (Twisted Nematic) scheme, a liquid crystal panel with a VA (Vertical Alignment) scheme, or a liquid crystal panel with an IPS (In-Place-Switching) scheme.

Here will be described liquid crystal panels with the TN scheme, the VA scheme, and the IPS scheme that control the polarizing direction of the incident light by the voltage to be applied to liquid crystal. FIG. 11 is a table summarizing features of the liquid crystal panels with the TN scheme, the VA scheme, and the IPS scheme. Here, as an example of the TN scheme, there is shown a type in which light is blocked and the display on the screen becomes black when the voltage to be applied to the liquid crystal panel is maximized and the display on the screen becomes white when the voltage is not applied to the liquid crystal panel. Meanwhile, as an example of the VA scheme and the IPS scheme, there is shown a type in which light is blocked and the display on the screen become black when the voltage is not applied to the liquid crystal panel and the display on the screen becomes white when the voltage to be applied to the liquid crystal panel is maximized.

In comparison of contrast among the schemes, the VA scheme exhibits the greatest contrast, and the TN scheme exhibits the second greatest contrast. Therefore, among the three schemes, the IPS scheme is the worst in contrast performance. In comparison of viewing angle among the schemes, the IPS scheme exhibits the greatest viewing angle, and the VA scheme exhibits the second greatest viewing angle. Therefore, among the three schemes, the TN scheme is the worst in viewing angle performance. In FIG. 11, as for the numerals in the sections for the contrast and the viewing angle, a smaller value means a better performance.

In the following, there will specifically be described configuration examples of the display device in the case where transmissive liquid crystal panels with the above-described schemes are used as the transmissive liquid crystal panel 301.

Here, the reference is set to the polarizing direction of the polarizing plate 302 on the light emission side of the liquid crystal panel; that is, the transmission axis of the polarizing plate 302. In the case of using a type of TN-scheme liquid crystal panel in which the phase of light changes by $\frac{1}{2}\lambda$ in a state where the voltage is not applied to the liquid crystal panel, the polarizing direction of the light transmitted by the liquid crystal panel is orthogonal to the polarizing direction of the light entering the liquid crystal panel. Accordingly, in the case of using this type of TN-scheme liquid crystal panel, the polarizing direction of the light entering the liquid crystal panel is required to be rotated by 90° with respect to the reference.

In the case of a type of VA scheme or IPS scheme in which the phase of light changes by $\frac{1}{2}\lambda$ in a state where the maximum voltage is applied to the liquid crystal panel, the polarizing direction of the light entering the liquid crystal panel is required to be rotated by 90° with respect to the reference. On the other hand, in a state where the voltage is not applied to the liquid crystal panel, the polarization state does not change.

Accordingly, even when any of the above TN scheme, VA scheme, and IPS scheme is used for the liquid crystal panel, the polarizing direction of the light emitted by the projection unit 20 only has to be a direction orthogonal to the reference.

FIG. 12 is a table summarizing configuration examples in the case where the display device is configured by the projection unit 20 that emits the linearly polarized light as shown in the above embodiment. As described above, the polarizing direction of the light entering the liquid crystal panel is required to be rotated by 90° with respect to the reference. Therefore, as shown in Configuration Examples 1 and 4 in FIG. 12, in the case where the polarizing direction of the emission light of the projection unit 20 is the same as the direction of the reference, a $\frac{1}{2}\lambda$ plate that is a retardation plate in which a retarded phase axis or an advanced phase axis is disposed at an orientation angle of 90° on the polarization plane for the incident light is inserted between the projection unit 20 and the transmissive liquid crystal panel 301, so that the polarizing direction becomes orthogonal to the reference. The above retardation plate 211 corresponds to such a retardation plate. In the case where the polarizing direction of the emission light of the projection unit 20 is orthogonal to the reference as shown in Configuration Examples 2 and 3 in FIG. 12, it is not necessary to change the polarizing direction of the emission light of the projection unit 20, and therefore, the insertion of the retardation plate is unnecessary.

FIG. 13 is a table summarizing configuration examples in the case where the display device is configured by a projection unit that emits circularly polarized light. In the case where the above-described display device is configured using a projection unit in which the emission light is circularly polarized light instead of the projection unit 20 that emits the linearly polarized light, as shown in Configuration Examples 5 and 6 in FIG. 13, a $\frac{1}{4}\lambda$ plate that is a retardation plate in which a retarded phase axis or an advanced phase axis is disposed at an orientation angle of 45° with respect to the reference is inserted between the projection unit 20 and the transmissive liquid crystal panel 301, so that the polarizing direction becomes orthogonal to the reference. In FIG. 13, Configuration Example 5 shows a configuration example in which the projection unit emits clockwise or counterclockwise circularly polarized light in the case where the transmission axis of the polarizing plate is in the vertical direction. Configuration Example 6 shows a configuration example in which the projection unit emits clockwise or counterclockwise circularly polarized light in the case where the transmission axis of the polarizing plate is in the horizontal direction. In both configuration examples, it is possible to make the polarizing direction of the light entering the liquid crystal panel orthogonal to the reference, by rotating and adjusting the optical axis of the retardation plate depending on the rotation direction of the circularly polarized light.

FIG. 14 is a table summarizing configuration examples in the case where the display device is configured by a projection unit that emits unpolarized light. In the case where the above-described display device is configured using a projection unit in which the emission light is unpolarized light instead of the projection unit 20 that emits the linearly polarized light, as shown in Configuration Examples 7 and 8 in FIG. 14, the display device is configured as follows. That is, in the display device, a polarizing plate having a transmission axis orthogonal to the transmission axis of the polarizing plate 302 on the light emission side of the liquid crystal panel is inserted between the projection unit 20 and the transmissive liquid crystal panel 301, so that the polarizing direction of the light entering the transmissive liquid crystal panel 301 becomes orthogonal to the reference. In the display device, the retardation plate is not always necessary.

As described above, various types of projection units can be employed. FIG. 12 to FIG. 14 show, by way of example, only the case where the polarizing direction of the polarizing plate 302 on the light emission side of the liquid crystal panel is the horizontal direction or the vertical direction, but needless to say, the display device can be appropriately configured even by rotation to another direction.

As described above, panels with various schemes including the TN scheme, the VA scheme, and the IPS scheme can be employed as the scheme of the transmissive liquid crystal panel. In the case where the object to be seen by a person who views pictures on the display device; that is, the user, is a liquid crystal panel, it is preferable to use the IPS scheme, which has a better viewing angle than the TN scheme and the VA scheme. Therefore, in the display device according to Embodiment 1, it is preferable to use the liquid crystal panel with the IPS scheme, as the transmissive liquid crystal panel 301. On the other hand, in the display device according to Embodiment 2, the object to be seen by the user is the screen 303, and therefore, the contrast performance is more important than the viewing angle performance, which depends on the scheme of the liquid crystal panel. Accordingly, it is preferable to use the liquid crystal panel with the VA scheme, as the transmissive liquid crystal panel 301.

The liquid crystal panel having a configuration in which the liquid crystal transmits light when the polarizing direction is rotated by 90° has been described. For example, in the case of using a liquid crystal panel having a configuration in which the liquid crystal blocks light when the polarizing direction is rotated by 90°, the polarizing direction of the emission light of the projection unit may coincide with the above reference. Thus, the display device only has to be configured such that the light having the polarizing direction required for the incident light of the liquid crystal panel enters the liquid crystal panel.

What is claimed is:

1. A display device comprising:
   a projection unit configured to emit light modulated depending on a first picture signal, the first picture signal including three primary color signals;
   a display unit configured to comprise a first screen, a transmissive liquid crystal panel, a polarizing plate, and a second screen, the first screen having a characteristic for maintaining the polarization of the entering light, the transmissive liquid crystal panel modulating incident light depending on a second picture signal, and then emitting the light, the second picture signal including three primary color signals, the polarizing plate emitting light that is included in the incident light and that has a predetermined polarizing direction; and
   a display control unit configured to generate the first picture signal for driving the projection unit and the second picture signal for driving the transmissive liquid crystal panel, from an input picture signal, and generate a synchronization signal for synchronizing the first picture signal and the second picture signal, the input picture signal including three primary color signals,
   wherein the display unit is configured such that the first screen, the transmissive liquid crystal panel, the polarizing plate, and the second screen are arrayed in this order with respect to an advancing direction of the light that is emitted from the projection unit.

2. The display device according to claim 1, further comprising a retardation plate, wherein
   the light emitted from the projection unit is linearly polarized light or circularly polarized light, and
   the light emitted from the projection unit enters the transmissive liquid crystal panel through the retardation plate.

3. The display device according to claim 1, further comprising an incidence-side polarizing plate on an incidence side of the transmissive liquid crystal panel, the incidence-side polarizing plate being a separate polarizing plate from the polarizing plate, wherein
   the light emitted from the projection unit is unpolarized light, and
   the light emitted from the projection unit enters the transmissive liquid crystal panel through the incidence-side polarizing plate.

4. The display device according to claim 1, wherein
   the display control unit comprises: a first lookup table unit configured to adjust an output characteristic of the projection unit to a first output characteristic; and a second lookup table unit configured to adjust an output characteristic of the transmissive liquid crystal panel to a second output characteristic, the display control unit adopting an output of the first lookup table unit with respect to the input picture signal, as the first picture signal, and adopting an output of the second lookup table unit with respect to the input picture signal, as the second picture signal,
   a sum of a gamma value of the first output characteristic and a gamma value of the second output characteristic is equal to a gamma value of the input picture signal, and
   the gamma value of one output characteristic exhibiting a higher contrast in comparison between the output characteristics of the projection unit and the transmissive liquid crystal panel is adjusted so as to be greater than the gamma value of the other output characteristic exhibiting a lower contrast in the comparison between the output characteristics of the projection unit and the transmissive liquid crystal panel.

5. The display device according to claim 4, wherein a light output is a maximum in the output characteristic of the transmissive liquid crystal panel, when an input value of the second picture signal is a predetermined value or greater.

* * * * *